(12) United States Patent
Bouchard

(10) Patent No.: US 8,732,566 B2
(45) Date of Patent: May 20, 2014

(54) METHODS AND APPARATUS FOR DIGITAL CONTENT HANDLING

(75) Inventor: Thaddeus Bouchard, Andover, MA (US)

(73) Assignee: Omtool, Ltd., Andover, MA (US)

( * ) Notice: Subject to any disclaimer, the term of this patent is extended or adjusted under 35 U.S.C. 154(b) by 437 days.

(21) Appl. No.: 12/209,720

(22) Filed: Sep. 12, 2008

(65) Prior Publication Data

US 2009/0106276 A1 Apr. 23, 2009

Related U.S. Application Data

(63) Continuation-in-part of application No. 11/564,645, filed on Nov. 29, 2006.

(60) Provisional application No. 61/034,942, filed on Mar. 7, 2008, provisional application No. 61/057,112, filed on May 29, 2008.

(51) Int. Cl.
*G06F 17/00* (2006.01)

(52) U.S. Cl.
USPC .......................................... 715/200; 705/301

(58) Field of Classification Search
USPC .......................................... 715/200; 705/301
See application file for complete search history.

(56) References Cited

U.S. PATENT DOCUMENTS

| | | | |
|---|---|---|---|
| 4,392,021 A | 7/1983 | Slate | |
| 4,958,235 A | 9/1990 | Sims et al. | |
| 4,974,254 A | 11/1990 | Perine et al. | |
| 4,985,919 A | 1/1991 | Naruse et al. | |
| 4,994,926 A | 2/1991 | Gordon et al. | |
| 5,155,601 A | 10/1992 | Toyama | |
| 5,166,977 A | 11/1992 | Ross | |
| 5,168,376 A | 12/1992 | Motohama | |
| 5,202,920 A | 4/1993 | Takahashi | |
| 5,255,106 A | 10/1993 | Castro | |
| 5,287,199 A | 2/1994 | Zoccolillo | |

(Continued)

FOREIGN PATENT DOCUMENTS

| | | |
|---|---|---|
| CA | 1329852 C | 5/1994 |
| CA | 2189211 A1 | 3/1998 |

(Continued)

OTHER PUBLICATIONS

FlowPort User Guide; Aug. 2000; Xerox Corporation; pp. 2-4, 3-10, 4-3, 4-6, 5-3, 5-4, 5-5, 5-18, and 5-38.
International Search Report for PCT/US02/34673 (3 pgs.).
Menezes, A.J. et al., Handbook for Applied Cryptography, Prentice Hall, Inc., 553-561 (1997).

*Primary Examiner* — Doug Hutton, Jr.
*Assistant Examiner* — Andrew McIntosh
(74) *Attorney, Agent, or Firm* — Choate Hall & Stewart LLP; William R. Haulbrook

(57) ABSTRACT

In one aspect, the invention provides a content handling system that comprises a digital data store containing a plurality of instruction sets, each defining a content handling workflow. The system further includes a content handling engine in communications coupling with the store, wherein the content handling engine identifies an embedded code in an article of content. The engine executes on at least that article of content one or more of the instruction sets associated with the embedded code. The instruction set can specify, for example, one or more destinations for articles of content (e.g., e-mail addresses, local or network file system folders, and on-line data stores).

26 Claims, 5 Drawing Sheets

(56) References Cited

U.S. PATENT DOCUMENTS

| | | |
|---|---|---|
| 5,291,302 A | 3/1994 | Gordon et al. |
| 5,339,174 A | 8/1994 | Harris |
| 5,339,361 A | 8/1994 | Schwalm et al. |
| 5,404,231 A | 4/1995 | Bloomfield |
| 5,417,488 A | 5/1995 | Horton |
| 5,452,099 A | 9/1995 | Von Meister |
| 5,459,584 A | 10/1995 | Gordon et al. |
| 5,465,300 A | 11/1995 | Altschuler et al. |
| 5,530,755 A | 6/1996 | Pailles |
| 5,535,277 A | 7/1996 | Shibata et al. |
| 5,539,530 A | 7/1996 | Reifman et al. |
| 5,552,897 A | 9/1996 | Mandelbaum et al. |
| 5,553,145 A | 9/1996 | Micali |
| 5,555,307 A | 9/1996 | Le Corre et al. |
| 5,587,809 A | 12/1996 | Le Corre et al. |
| 5,590,196 A | 12/1996 | Moreau |
| 5,615,269 A | 3/1997 | Micali |
| 5,621,539 A | 4/1997 | Brown et al. |
| 5,629,982 A | 5/1997 | Micali |
| 5,666,420 A | 9/1997 | Micali |
| 5,671,285 A | 9/1997 | Newman |
| 5,673,316 A | 9/1997 | Auerbach et al. |
| 5,771,101 A | 6/1998 | Bramall |
| 5,790,665 A | 8/1998 | Micali |
| 5,805,719 A | 9/1998 | Pare et al. |
| 5,812,670 A | 9/1998 | Micali |
| 5,835,726 A | 11/1998 | Shwed et al. |
| 5,859,967 A | 1/1999 | Kaufeld et al. |
| 5,903,721 A | 5/1999 | Sixtus |
| 5,909,289 A | 6/1999 | Shibata et al. |
| 5,982,505 A | 11/1999 | Jeon |
| 6,011,847 A | 1/2000 | Follendore, III |
| 6,014,228 A | 1/2000 | Castro |
| 6,014,631 A | 1/2000 | Teagarden et al. |
| 6,023,345 A | 2/2000 | Bloomfield |
| 6,073,118 A | 6/2000 | Gormish et al. |
| 6,134,326 A | 10/2000 | Micali |
| 6,137,884 A | 10/2000 | Micali |
| 6,141,750 A | 10/2000 | Micali |
| 6,148,301 A | 11/2000 | Rosenthal |
| 6,157,706 A | 12/2000 | Rachelson |
| 6,161,181 A | 12/2000 | Haynes, III et al. |
| 6,182,118 B1 | 1/2001 | Finney et al. |
| 6,192,165 B1 | 2/2001 | Irons |
| 6,192,407 B1 | 2/2001 | Smith et al. |
| 6,266,159 B1 | 7/2001 | Otsuka et al. |
| 6,427,032 B1 | 7/2002 | Irons et al. |
| 6,430,691 B1 | 8/2002 | Di Santo et al. |
| 6,470,086 B1 | 10/2002 | Smith |
| 6,487,599 B1 | 11/2002 | Smith et al. |
| 6,570,667 B1 | 5/2003 | Hattori et al. |
| 6,609,196 B1 | 8/2003 | Dickinson, III et al. |
| 6,625,642 B1 | 9/2003 | Naylor et al. |
| 6,670,537 B2 | 12/2003 | Hughes et al. |
| 6,744,761 B1 * | 6/2004 | Neumann et al. ............. 370/389 |
| 6,744,936 B2 | 6/2004 | Irons et al. |
| 6,760,752 B1 | 7/2004 | Liu et al. |
| 6,867,876 B1 | 3/2005 | Czyszczewski et al. |
| 6,889,321 B1 | 5/2005 | Kung et al. |
| 6,952,281 B1 | 10/2005 | Irons et al. |
| 6,977,740 B1 | 12/2005 | Mandalia |
| 6,981,023 B1 | 12/2005 | Hamilton et al. |
| 7,020,843 B2 | 3/2006 | Hamlett et al. |
| 7,050,188 B1 | 5/2006 | Yajima et al. |
| 7,080,409 B2 | 7/2006 | Eigeles |
| 7,082,538 B2 | 7/2006 | Bouchard et al. |
| 7,116,433 B1 | 10/2006 | Toyoda |
| 7,151,834 B1 | 12/2006 | Cannon et al. |
| 7,168,036 B2 | 1/2007 | Klotz, Jr. et al. |
| 7,283,270 B2 | 10/2007 | Boire-Lavigne et al. |
| 7,308,477 B1 | 12/2007 | Gress et al. |
| 7,463,377 B2 | 12/2008 | Aoki |
| 7,596,691 B2 | 9/2009 | Koue et al. |
| 7,631,193 B1 | 12/2009 | Hoffman |
| 8,045,203 B2 | 10/2011 | Henry et al. |
| 2002/0002675 A1 | 1/2002 | Bush |
| 2002/0007453 A1 | 1/2002 | Nemovicher |
| 2002/0049618 A1 | 4/2002 | McClure et al. |
| 2002/0054334 A1 | 5/2002 | Harrison et al. |
| 2002/0055909 A1 | 5/2002 | Fung et al. |
| 2002/0078052 A1 | 6/2002 | Cheng |
| 2002/0087861 A1 | 7/2002 | Segev et al. |
| 2002/0091928 A1 | 7/2002 | Bouchard et al. |
| 2002/0093674 A1 | 7/2002 | Ferlitsch et al. |
| 2002/0099938 A1 | 7/2002 | Spitz |
| 2002/0138547 A1 | 9/2002 | Cherry et al. |
| 2002/0157028 A1 | 10/2002 | Koue et al. |
| 2003/0031341 A1 * | 2/2003 | Rhoads ........................ 382/100 |
| 2003/0043403 A1 | 3/2003 | Tashima |
| 2003/0046363 A1 | 3/2003 | Ezato |
| 2003/0058478 A1 | 3/2003 | Aoki |
| 2003/0065623 A1 | 4/2003 | Corneil et al. |
| 2003/0070074 A1 | 4/2003 | Geller et al. |
| 2003/0086124 A1 | 5/2003 | Parry |
| 2003/0095289 A1 | 5/2003 | Mitani |
| 2003/0099336 A1 | 5/2003 | Speeney et al. |
| 2003/0105725 A1 | 6/2003 | Hoffman |
| 2003/0115448 A1 | 6/2003 | Bouchard |
| 2003/0120729 A1 | 6/2003 | Kim et al. |
| 2003/0163431 A1 | 8/2003 | Ginter et al. |
| 2003/0163529 A1 | 8/2003 | Yamaguchi |
| 2003/0163552 A1 | 8/2003 | Savitzky et al. |
| 2003/0164986 A1 | 9/2003 | Boire-Lavigne et al. |
| 2003/0217034 A1 | 11/2003 | Shutt |
| 2004/0015779 A1 | 1/2004 | Shorter |
| 2004/0023656 A1 | 2/2004 | Purdy et al. |
| 2004/0042034 A1 * | 3/2004 | Tiffan et al. .................. 358/1.15 |
| 2004/0073613 A1 * | 4/2004 | Plewnia ........................ 709/206 |
| 2004/0111375 A1 | 6/2004 | Johnson |
| 2004/0125396 A1 | 7/2004 | Burke |
| 2004/0158733 A1 | 8/2004 | Bouchard |
| 2004/0184092 A1 * | 9/2004 | Ogawa ........................ 358/1.15 |
| 2004/0205137 A1 | 10/2004 | Chen et al. |
| 2004/0205616 A1 | 10/2004 | Rosenberg et al. |
| 2004/0230807 A1 | 11/2004 | Baird et al. |
| 2005/0055337 A1 | 3/2005 | Bebo et al. |
| 2005/0097046 A1 | 5/2005 | Singfield |
| 2005/0097171 A1 | 5/2005 | Hikichi |
| 2005/0102354 A1 | 5/2005 | Hollenbeck et al. |
| 2005/0125319 A1 | 6/2005 | Johnson |
| 2005/0131815 A1 | 6/2005 | Fung et al. |
| 2005/0182656 A1 | 8/2005 | Morey |
| 2005/0195447 A1 * | 9/2005 | Os .................................. 358/407 |
| 2005/0225791 A1 | 10/2005 | Lee |
| 2005/0257247 A1 | 11/2005 | Moriconi et al. |
| 2006/0028691 A1 * | 2/2006 | Perry et al. ................... 358/3.28 |
| 2006/0064389 A1 | 3/2006 | Doll-Steinberg |
| 2006/0293989 A1 | 12/2006 | Morrison et al. |
| 2007/0013960 A9 | 1/2007 | Gordon et al. |
| 2007/0112854 A1 | 5/2007 | Franca |
| 2007/0180032 A1 | 8/2007 | Pearson |
| 2007/0192275 A1 * | 8/2007 | Foygel et al. ..................... 707/1 |
| 2007/0208875 A1 * | 9/2007 | Plewnia ........................ 709/238 |
| 2007/0208931 A1 | 9/2007 | Koue et al. |
| 2008/0007793 A1 | 1/2008 | Filbrich et al. |
| 2008/0123124 A1 | 5/2008 | Smithson |
| 2008/0126513 A1 | 5/2008 | Bouchard et al. |
| 2008/0147506 A1 | 6/2008 | Ling |
| 2009/0178111 A1 | 7/2009 | Moriconi et al. |

FOREIGN PATENT DOCUMENTS

| | | |
|---|---|---|
| EP | 1234253 A1 | 8/2007 |
| WO | WO-9914979 A1 | 3/1999 |
| WO | WO-9934304 A1 | 7/1999 |
| WO | WO-0135273 A1 | 5/2001 |
| WO | WO-0152485 A1 | 7/2001 |
| WO | WO-03036515 | 5/2003 |

\* cited by examiner

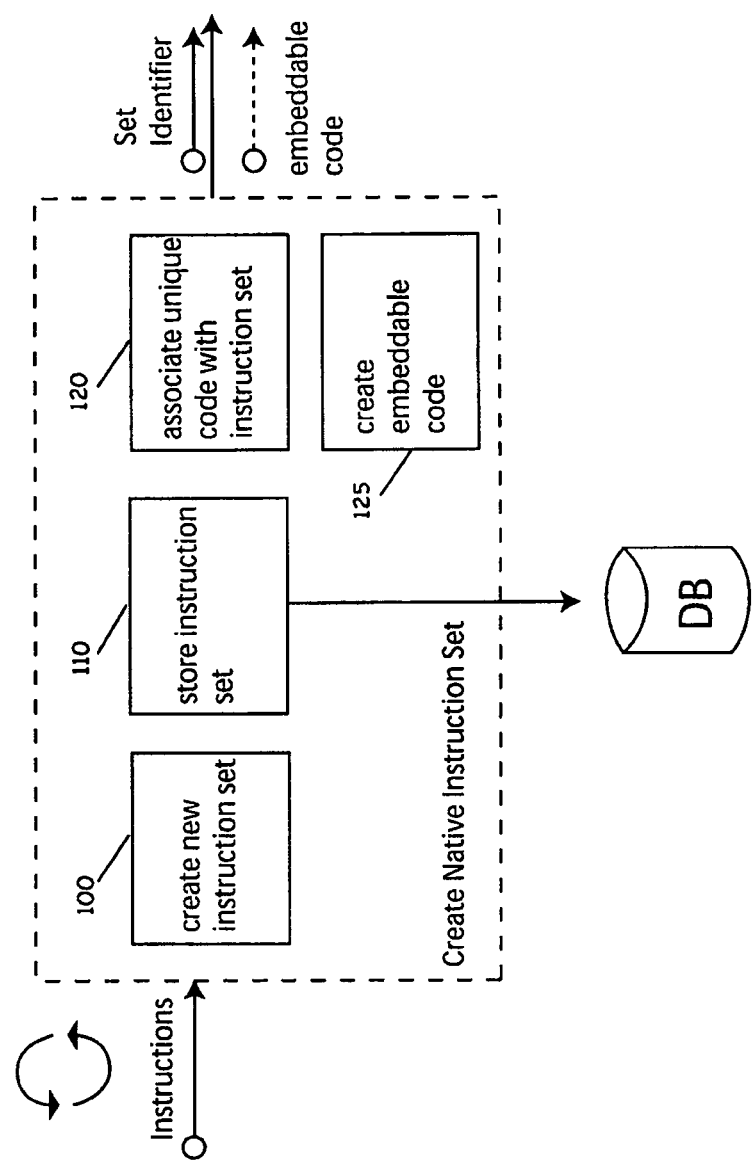

METHODS AND APPARATUS FOR DIGITAL CONTENT HANDLING

This application claims the benefit of filing of U.S. Patent Application Ser. No. 61/057,112, filed May 29, 2008 and 61/034,942, Mar. 7, 2008, both entitled "Methods and Apparatus for Digital Content Handling," and this application is a continuation-in-part of U.S. patent application Ser. No. 11/564,645, filed Nov. 29, 2006, entitled "Methods and Apparatus for Enterprise Document Distribution." The teachings of all of the foregoing applications are incorporated herein by reference.

BACKGROUND OF THE INVENTION

The invention pertains to information technology and, more particularly, to content handling. It has application, by way of non-limiting example, in the routing of digital content, e.g., within and among enterprises.

To date, the routing and other handling of digital content, e.g., within and among enterprises, has been largely limited to electronic document distribution. That field has traditionally been long on promise, but short on delivery. The advent of each new electronic document technology has brought the hope of easy dissemination—not only between the document's original creator and recipient, but also among subsequent recipients inside and outside an enterprise. However, the degree to which this has been achieved in practice varies widely. On one end of the spectrum is e-mail, which is built on a protocol designed for distribution and redistribution and which serves both functions well. On the other end of the spectrum are word processing and scanner technologies, both originally intended for document creation, and both which often achieve distribution only through add-on or third-party solutions.

More recent activity in the art has been directed towards leveraging peer-to-peer networking and Web 2.0 technologies to distribute digital media content (e.g., movies, music, etc.), in addition to electronic documents. For example, iTunes distributes a variety of content including music, movies, television shows, etc., sourced by record companies, movie studios and other more traditional content providers, and YouTube provides a website for users to post and/or view streaming videos. While these are examples of recent digital media distribution systems, they do not address the typical requirements a user may expect from a content management system, e.g., customization and integration with an enterprise network.

Such is among the objects of the present invention. More generally, an object of the invention is to provide improved methods and apparatus for digital content handling.

A further object of the invention is to provide such methods and apparatus as are scalable and as provide the flexibility to support a range of user and enterprise needs.

A still further object of the invention is to provide such methods and apparatus as can be utilized in connection with data processing and other technologies—such as scanners, voice dictation systems, document capture and mark-up systems (e.g., those utilizing the Adobe PDF format) that are conventional in the marketplace.

SUMMARY OF THE INVENTION

In one aspect, the invention provides a content handling system that comprises a digital data store containing a plurality of instruction sets, each defining a content handling workflow. The system further includes a content handling engine in communications coupling with the store, wherein the content handling engine identifies an embedded code in an article of content. The engine executes on at least that article of content one or more of the instruction sets associated with the embedded code.

In related aspects, the invention provides a content handling system as described above in which an article of content comprises any of digitally encoded information (e.g., containing one or more of text, image, audio, video, data, and PACS data) and/or information otherwise convertible to digital format (e.g., printed matter, images, film, and audio recordings).

In related aspects, the invention provides systems as described above in which the instruction set specifies any of (i) one or more destinations for articles of content (e.g., e-mail addresses, local or network file system folders, and on-line data stores), (ii) one or more formats (e.g., text, image, audio, video, data, PACS data formats) in which articles of content are to be delivered to those destinations, (iii) additional content (e.g., textual, image, audio, video, data, and PACS data content) to be delivered to those destinations, (iv) one or more conversions (e.g., optical character recognition, voice-to-text, and image resolution upgrading/downgrading) to be executed on articles of content.

Further aspects of the invention provide a content handling system comprising a content source and a content handling engine in communications coupling with the content source. The content handling engine identifies an embedded code in an article of content from the content source and executes on at least that article of content one or more instructions associated with (or defined in) the embedded code, distributing, storing and/or otherwise processing the article as defined by the instructions.

In still yet further related aspects, the invention provides systems as described above in which the embedded code is associated with a unique identification of an instruction set of the type described above.

In further related aspects, the invention provides systems as described above in which the embedded code is created and/or embedded in articles of content by a system external to the content handling system. Such an external system can include, by way of non-limiting example, an e-mail system, an enterprise content management system or other systems (possibly, including a combination of automated, semi-automated or manual elements) from which articles of content processed by the content handling engine are obtained. Such embedded codes can include hand-written notes, bar codes, text strings, content type codes, voice commands, audio signals, image elements, all by way of example.

In still further related aspects, the invention provides systems as described above in which the embedded code is translated by the content handling engine into the unique instruction set identification with which it is associated.

In still yet further related aspects, the invention provides systems as described above in which the aforementioned digital data store is distributed.

In still further related aspects, the invention provides systems as described above in which the embedded code is not contained at a predefined position in the article of content, and in which the content handling engine identifies the embedded code by at least searching the article to find the embedded code. In further related aspects, the invention provides systems as described above in which the content handling engine identifies the embedded code by any of bar code recognition, voice recognition, optical character recognition and voice-to-text conversion.

In yet further aspects, the invention provides systems as described above in which the content handling engine alternatively or additionally identifies the embedded code in metadata or other information fields associated with (i) an article of content, (ii) a packet, file or other container in which such article is transmitted or contained, and/or (iii) a data store, content management system or other store from which the article is sourced and/or maintained.

In related aspects, the invention provides systems as described above in which the content handling engine discerns the embedded code from a characteristic of the article itself (e.g., type of content, such as scanned document, music, image, etc.), the manner in which it is encoded and/or stored (e.g., pdf, mp4, tiff, etc.), and/or the substance of the content (e.g., specific words and/or images contained in the article of content).

In still further related aspects, the invention provides systems as described above in which the content handling engine identifies the embedded code by transforming at least a portion of the article of content from a first format to a second format and extracting the embedded code therefrom.

Still other aspects of the invention provide methods paralleling the operations described above.

These and other aspects of the invention are evident in the drawings and text that follows.

BRIEF DESCRIPTION OF THE DRAWINGS

A more complete understanding of the invention may be attained by reference to the drawings, in which:

FIG. 4A-4B depict operation of the content handling engine of FIG. 2.

DETAILED DESCRIPTION OF THE ILLUSTRATED EMBODIMENT

Figure 1:
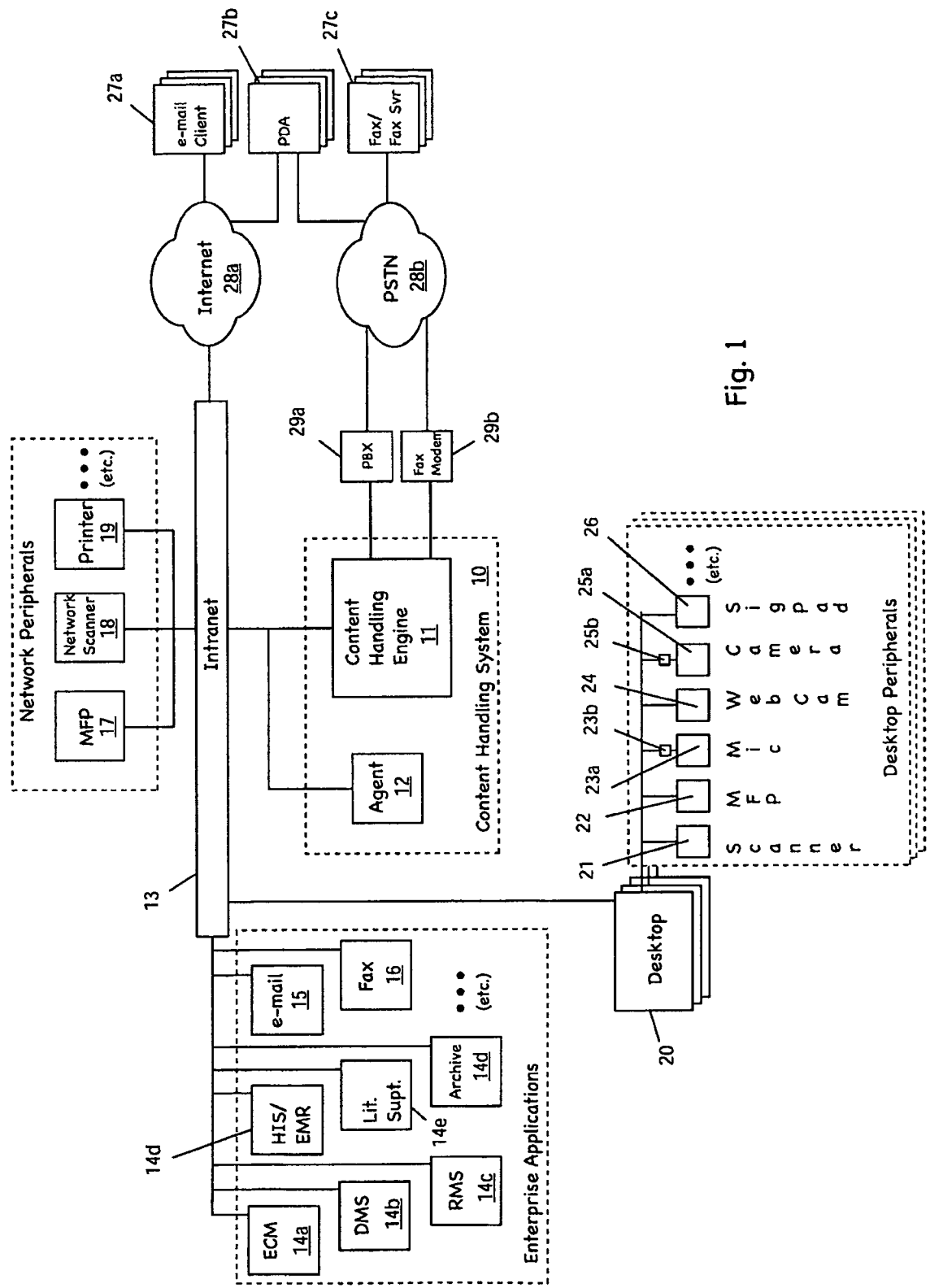
FIG. 1 depicts an enterprise digital data processing system that includes a content handling system according to the invention.

FIG. 1 depicts an enterprise digital data processing system with a content handling system according to the invention. This includes a content handling system 10 that is coupled for communication with devices and systems on an intranet 13 (e.g., enterprise applications 44, network peripherals 17-19, client computers (e.g., desktop computers, portable computers, personal digital assistants, and so forth) 20 and associated peripherals 21-26, etc.) and with systems and devices (e.g., e-mail client 27a, personal digital assistant 27b, fax/fax server 27c) on external networks (e.g., the Internet 28a and/or the public switched telephone network 28b via PBX 29a and/or fax modem 29b), as shown. In the illustrated embodiment, the content handling system 10 comprises content handling engine 11 and agent 12; the enterprise applications 44 includes one or more of a enterprise content management system 14a, document management system 14b, records management system 14c, healthcare information system/electronic medical records system 14d, litigation support system 14e, archive system 14f, e-mail server 15, and fax/fax server 16; the network peripherals include one or more of a multifunction printer (MFP) device 17, network scanner 18, and printer 19; client computer peripherals include one or more of a and scanner 21, MFP 22, audio input device, e.g., microphone 23a, and digitalization module 23b, web camera 24, imaging device, e.g., video camera 25a, digitalization module 25b, signature pad 26, all as shown by way of non-limiting example. The illustrated configuration is just one of many in which the invention can be practiced. For example, there may be a greater or lesser number of elements than those shown here and they may be coupled for communication by peer-to-peer networks, wide area networks, the Internet, or other communications media (wired, wireless, or otherwise), or combinations thereof, of the type known in the art.

Illustrated content handling system 10 comprises a content handling engine 11 and an agent 12, as shown. Content handling engine 11 comprises a digital data processor that facilitates the workflow-based processing and distribution to and/or from devices and/or systems 14-27, among others, of articles of digital content (e.g., PDF documents, Microsoft Word documents, e-mails, audio and WAV files, movie files, PACS images, etc.), or of content which can be converted to digital format (e.g., scannable paper, analog movies or recordings, X-rays, pictures. etc) and contained in such articles. That digital data processor may be a desktop computer, workstation, mainframe or other computing device suitable for and adapted to operation in accord with the teachings hereof.

Devices and/or systems 14-27 comprise external or "foreign" systems, i.e., systems that are external to the content handling engine 11 and that generate, store, manage or otherwise maintain content for processing by the content handling engine 11. By way of non-limiting example, a foreign system can include a client database management system (e.g., for storing audio files, movie files, PDF documents, etc.) that transmits content to a "native" system (e.g., content handling engine 11 and its associated stores (e.g., see elements 42 and 43 of FIG. 2) operating in accord with the invention) for processing and distribution. Though a select number of foreign systems are shown in the illustrated embodiment, other embodiments have lesser, greater and or other foreign systems—including, by way of non-limiting example, web sites and/or repositories on the Internet, remote networks, and the like.

Illustrated client computers 20 comprise any of a variety of digital data processing devices used to execute client applications, such as word processors, spreadsheet programs, e-mail clients, web browsers, document capture and mark-up programs (e.g., Adobe Acrobat and/or related applications), still and moving/video image editing applications, dictation, text-to-voice, and/or voice-to-text applications and any of a host of other applications available in the marketplace suitable for generating, storing, managing or otherwise maintaining digital content. In the drawing, the client computers 20 are shown as desktop computers on an Intranet 13 (e.g., implemented in a wired local area network), though they may comprise laptop computers, personal digital assistants, workstations, mainframe computers, or otherwise, that are coupled for communications by wire, wirelessly, or otherwise. Regardless, these devices are constructed and operated in the conventional manner known in the art, as adapted in accord with the teachings hereof.

Enterprise content management system 14a, document management system 14b, records management system 14c, healthcare information system/electronic medical records system 14d, litigation support system 14e, archive system 14f, e-mail server 15, fax/fax-server 16, MFP 17, network scanner 18, printer 19 and comprise conventional digital data devices and/or systems of the respective types (i.e., content repository, scanner, MFP, printer, and fax/fax-server, respectively) available in the marketplace, as adapted for operation in accord with the teachings hereof.

This is likewise true of client computer peripherals scanner 21, MFP 22, audio input device, e.g., microphone 23a, and digitalization module 23b, web camera 24, imaging device, e.g., video camera 25a, digitalization module 25b, signature pad 26. Thus, by way of non-limiting example, microphone 23a and camera 25a comprise typical analog and/or digital imaging (e.g., video, still, or otherwise) and audio recording devices conventionally known in the art. Digitalization modules 23b and 25b transform captured audio recordings and analog images, respectively, to a digital format and, thereby, facilitate their processing and distribution by the content handling engine 11. The illustrated camera 25a, for example, may comprise an analog video camera (e.g., camcorder, etc,) used to record a conference, seminar, or the like. Prior to processing/distribution by the content handling engine 11, digitalization module 25b converts the recorded video to a digital format (e.g., MPEG, AVI, etc.). In the illustrated embodiment, the digitalized video is transmitted to the content handling engine 11 via Intranet 13, although in other embodiments it may be transmitted otherwise (e.g., via the Internet 28a, PSTN 28b, point-to-point connection, etc.).

With continued reference to FIG. 1, e-mail client 27a, PDA 27b and fax/fax server 27c, too, comprise conventional digital data devices and/or systems of their respective types available in the marketplace, as adapted for operation in accord with the teachings hereof.

Agent 12 is an autonomous component that proactively identifies content to be processed by the content handling engine 11. This can include searching foreign systems (e.g., document, e-mail or video archives, Internet sites, etc.) for articles of content with native or foreign codes (discussed below), as well as foreign instruction sets (also discussed below). When these are found, the agent 12 can generate a request to content handling engine 11 to process the articles with default and/or explicit native instruction sets.

Figure 2:
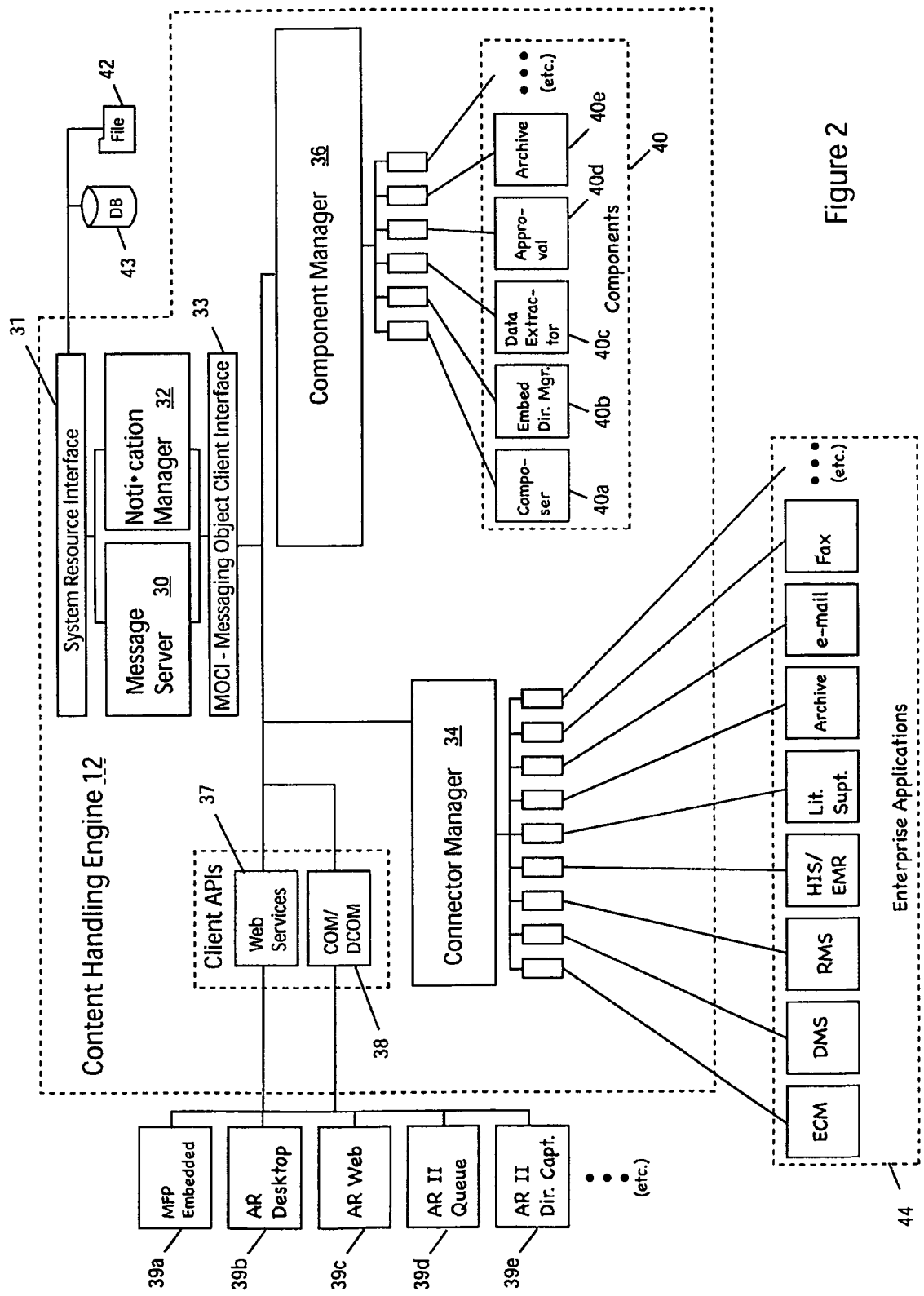
FIG. 2 depicts a content handling engine of the content handling system of FIG. 1.

FIG. 2 depicts further details of the content handling engine 11 of FIG. 1. As shown in the drawing, that content handling engine 11 comprises a message server 30, system resource interface 31, a notification manager 32, messaging object client interface (MOCI) 33, a connector manager 34, a component manager 36, and content distribution workflow processing components 40. The engine is coupled to client products 39a-39e by way of client APIs 37 and 38, and to enterprise applications 44, by way of connector manager 34, as shown, all by way of non-limiting example.

In the illustrated embodiment, elements 30-40 comprise software modules, e.g., objects, dynamic linked library (DLL) components, or otherwise, that execute on a single digital data processor or on multiple such devices. Those modules are coupled for communication as shown in the drawing and as otherwise evident herein. Such communication can be supported by the Windows® component object model (COM) and/or other mechanisms, whether or not object-oriented, known in the art, such as those used or useable in connection with object linking and embedding (OLE) technologies, ActiveX technologies, COM+ technologies, distributed component object model (DCOM) technologies, Microsoft's .NET framework, and common object request broker architecture (CORBA), to name just a few.

Illustrated message server 30 executes workflows for processing and distributing articles of content. In this regard, the server 30 keeps track of process state and settings, both for the content handling engine 11 as a whole, as well as for the individual workflows via which articles of content are processed and distributed. State information, both for content handling engine 11 and for the individual workflows, are maintained in a database 43 and associated files 42 (though in other embodiments this information can be maintained in tables, linked lists, and so forth, in memory or otherwise). The database 43 can be relational, or otherwise, as known in the art, and can support SQL queries or other retrieval mechanisms, again, as known in the art.

As discussed in greater detail below, the message server 30 also facilitates creation and modification of native instruction sets that define workflows for processing articles of content. In addition, it associates such sets with the articles themselves by defining a native code that uniquely references each native instruction set and by either (i) directly embedding that code within an article of content (e.g., upon request of a user or foreign system), and/or (ii) supplying the code to a user or foreign system for embedding in such an article. When the article is subsequently processed, the message server 30 executes the implicated instruction set upon identifying the embedded code, e.g., by optical-character recognition, voice recognition, or otherwise. A further understanding of the message server 30 can be attained reference to FIG. 3A-B and the discussion below.

Illustrated system resource interface 31 comprises operating system (and attendant file system) interface routines that provide for message server 30 and notification manager 32 access and updating of the database 43 and files 42. The interface 31 may also include file and/or database applications and/or middleware of the type known in the art (as adapted in accord with the teachings hereof) that further facilitate access and/or updating of database 43 and files 42 by the server 30 and manager 32.

Illustrated notification manager 32 filters and routes events between the connector manager 34 and the component manager 36, as well as signaling the message server 30 of event occurrence. In the illustrated embodiment, event notifications are generated using a publish-and-subscribe model, though other embodiments may utilize other models for event distribution. Notifications to the component manager 36 include signaling the workflow processing components 40 that they have new jobs or tasks to complete.

Illustrated messaging object client interface (MOCI) 33 comprises operating system and/or other resources that facilitate communication between the message server 30 and notification manager 32, on the one hand, and the connector manager 34, component manager 36 and client products 39a-39e, via client APIs 37, 38, on the other hand. In this regard, the MOCI 33 can comprise any object-based messaging technology of the type known in the art (as adapted in accord with the teachings hereof), suitable for supporting such communications. In other embodiments, non-object-based messaging technologies are employed, such as RPC, and so forth, again, as adapted in accord with the teachings hereof.

Illustrated client products 39a-39e comprise document delivery and management products of the type known in the art. Preferred such products are those commercially available from the assignee hereof, as part of the Accu-Route® family of document delivery and management products. However, competitive and other products of others may be used instead or in addition.

Illustrated connector manager 34 provides a framework for execution of connectors 34A that communicate with the enterprise applications 44. To this end, it utilizes a plug-in architecture to facilitate addition, removal and/or reconfiguration of interfaces to the hardware/software 44. In other embodiments, similar functionality can be provided via an extension-based architecture, or otherwise. The interfaces, themselves, can comprise device drivers, DLLs, or otherwise, as known in the art for communication with the devices, subsystems, and so forth, that make up hardware/software 44. The connector manager can also provide a framework for execution of connector that communicate with other devices and systems of the type shown in FIG. 1, e.g., client computers 20 and client applications 21-26, PBX 29a, and fax modem 29b, all by way of non-limiting example.

Component manager 36 controls which workflow processing components 40 are called during the processing sequence of a workflow. In the illustrated embodiment, each state of the workflow is executed by one (or more) of the components 40. In this regard, the component manager 36, like the connector manager 34, supports a plug-in architecture to facilitate addition, removal and/or reconfiguration of such components 40—though, in other embodiments, similar functionality can be provided via an extension-based architecture, or otherwise. The components 40 of the illustrated embodiment are COM components and include a composer component 40a, embedded directive manager component 40b, a data extractor component 40c, an approval component 40d and a archive component 40e. Other embodiments may use components 40 providing other functionality instead or in addition.

The composer component 40a of the illustrated embodiment is responsible for reformatting articles of content that are being processed during a workflow. To this end, the component 40a includes translation modules of the type known in the art (as adapted in accord with the teachings hereof) that can be used individually or in combination to effect required transformations. By way of further example, the composer component 40a can provide for optical character recognition (i.e., image-to-text), voice-to-text conversion, and image resolution upgrading/downgrading, just to name a few. For example, it can convert a 720×480 resolution AVI file to an MPEG file having a 640×480 resolution, e.g., for delivery to a particular data store or other specified destination.

The embedded directive manager component 40b of the illustrated embodiment is responsible for encoding and interpreting routing directives associated with articles of content. To this end, the component 40b transforms the underlying rules defining the routing directives into native codes which can be embedded into articles of content (e.g., prior to processing during a workflow). Conversely, it can additionally perform reverse transformations on encoded routing directives to produce rules which can be processed by the system (e.g., message server 30 during processing during a workflow). The component 40b may also manage the location or placement of such codes in the articles of content.

The data extractor component 40c of the illustrated embodiment is responsible for parsing meta-data and other non-content portions of articles of content being processed to facilitate identifying native codes and instruction sets. By way of non-limiting example, it identifies codes stored in meta-data and "body" fields of a PDF document, headers and messages in an e-mail document, etc. To this end, the component 40c may operate in conjunction with the embedded directive manager 40b to identify possible extraction locations within articles of content.

The approval component 40d of the illustrated embodiment is responsible for ensuring that all approval processing required in the workflow processing of an article of content are achieved, prior to advancing the article to a next state or step in the sequence. For example, a workflow may require a user signature on a PDF document, prior to printing the document, sending it to specified recipients, or performing other additional processing. Working with the data extractor 40c, the approval component 40 insures that a signature field in the PDF is completed before advancing the document for such processing.

The archive component 40e of the illustrated embodiment is responsible for storing codes, instruction sets, and in some embodiments, articles of content for archival purposes. To this end, component 40e takes "snapshots" of the database 43, e.g., at predetermined intervals or otherwise. The component 40e may also store all or specified articles of content, e.g., for specified time intervals, e.g., to prevent loss in the case of downstream equipment failures.

Illustrated client APIs 37 and 38 comprise web services and COM/DCOM modules provide an interface between the content handling engine 11, or more particularly, the message server 30, and the client-side products 39. For example, the API may provide a web-interface for a client transmitting an article of content from an AccuRoute system to the content handling engine 11 for processing and distribution.

The folder 42 of the illustrated embodiment serves as a temporary storage for articles content being processed by the content handling engine 11. Thus, for example, the message server 30 may search an article of content for an embedded code, as discussed further below, which article of content is temporarily stored in folder 42, e.g., for faster searching, etc., Illustrated temporary storage 42 can be implemented in memory (e.g., cache, RAM, etc.), or otherwise, as pointers, linked lists, and so forth.

The data store 43 (e.g., database or other repository) of the illustrated embodiment contains a record (or "queue") of all content handling requests and processing status information for workflows executed by the message server 30. As discussed above, it may store process and state settings, both for the content handling engine 11, as well as for individual workflows via which articles of content are processed and distributed. Although in the illustrated embodiment store 43 comprises a database (e.g., relational, or otherwise, as known in the art, and can support SQL queries or other retrieval mechanisms, again, as known in the art), although in other embodiments the store may maintain the information in tables, linked lists, and so forth, in memory or otherwise.

Figure 3A:
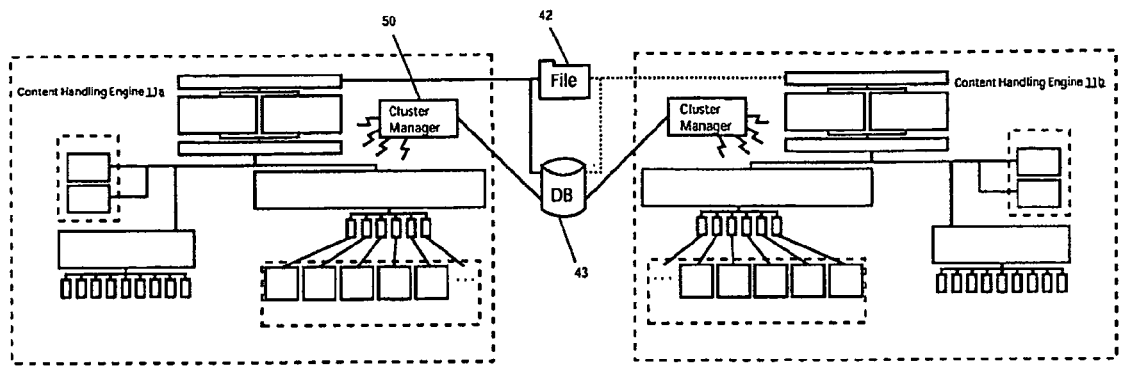
FIGS. 3A-3B depict embodiments of the invention utilizing a cluster manager for high availability of content handling functionality.
Figure 3B:
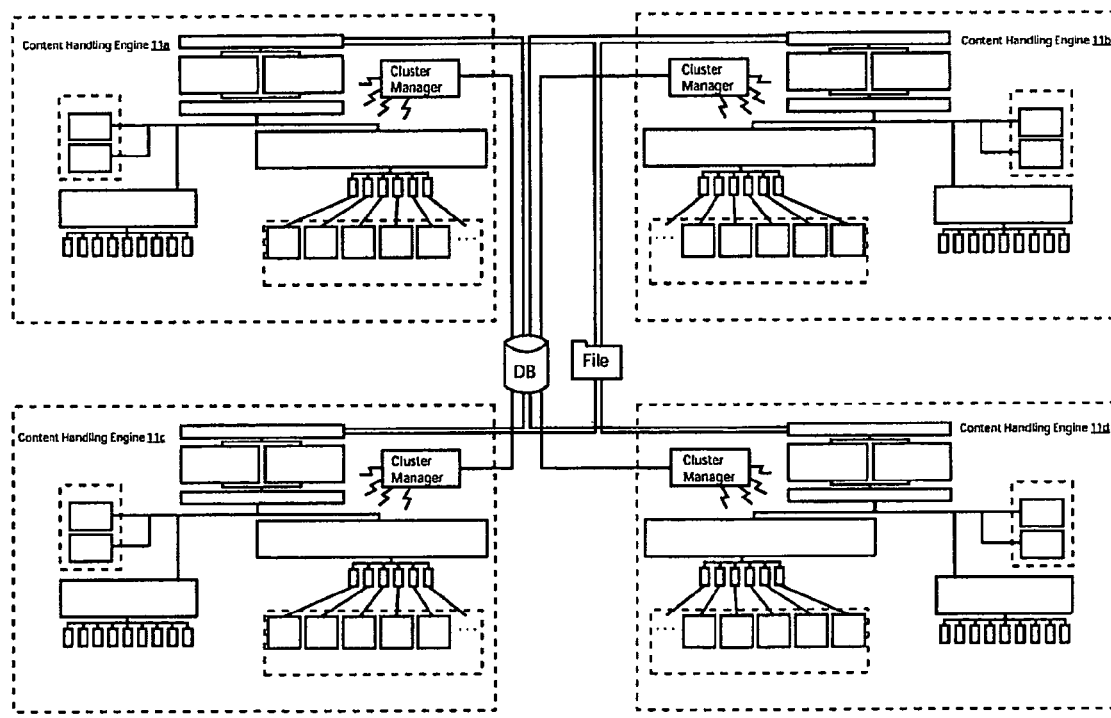

FIGS. 3A-3B depict embodiments of the invention utilizing a cluster manager 50 for high availability of content handling functionality. Referring to FIG. 3A, for example, there are shown two content handling engines 11a and 11b of the type shown in FIG. 2 and described above. The engines 11a and 11b operate in tandem and coordinate their actions so as to ensure high availability of the content handling engine functions—and, specifically, to ensure processing of queue content handling requests in the store 43.

In the embodiment of FIG. 3A, it achieves this by automated failover between/among engines 11a and 11b (in this regard it will be appreciated that, although only two engines 11a and 11b are shown in FIG. 3A, other embodiments may include additional engines that also operate in failure-over mode). Such failover mode processing can be achieved, for example, by utilizing the cluster manager 50 of each of the engines 11a and 11b to monitor state information in a common area of store 43. In the event of failure of the "active" engine 11a, the cluster manager 50 of the "passive" engine 11b notifies the other elements of the respective content handling systems to start up and take control of the work queue. It will be appreciated that failover mode processing can be achieved in other ways instead or in addition.

In the embodiment of FIG. 3B, the system achieves both high availability AND load balancing by providing multiple engines 11a and 11b operating simultaneously in a coordinated fashion to share the workload stored in the database/ store 43. Like the embodiment of FIG. 3A, the cluster managers 50 of the engines 11a and 11b monitor state information in the common area of store 43 to achieve automatic load balancing and failover across the systems 11a and 11b.

Figure 4B:
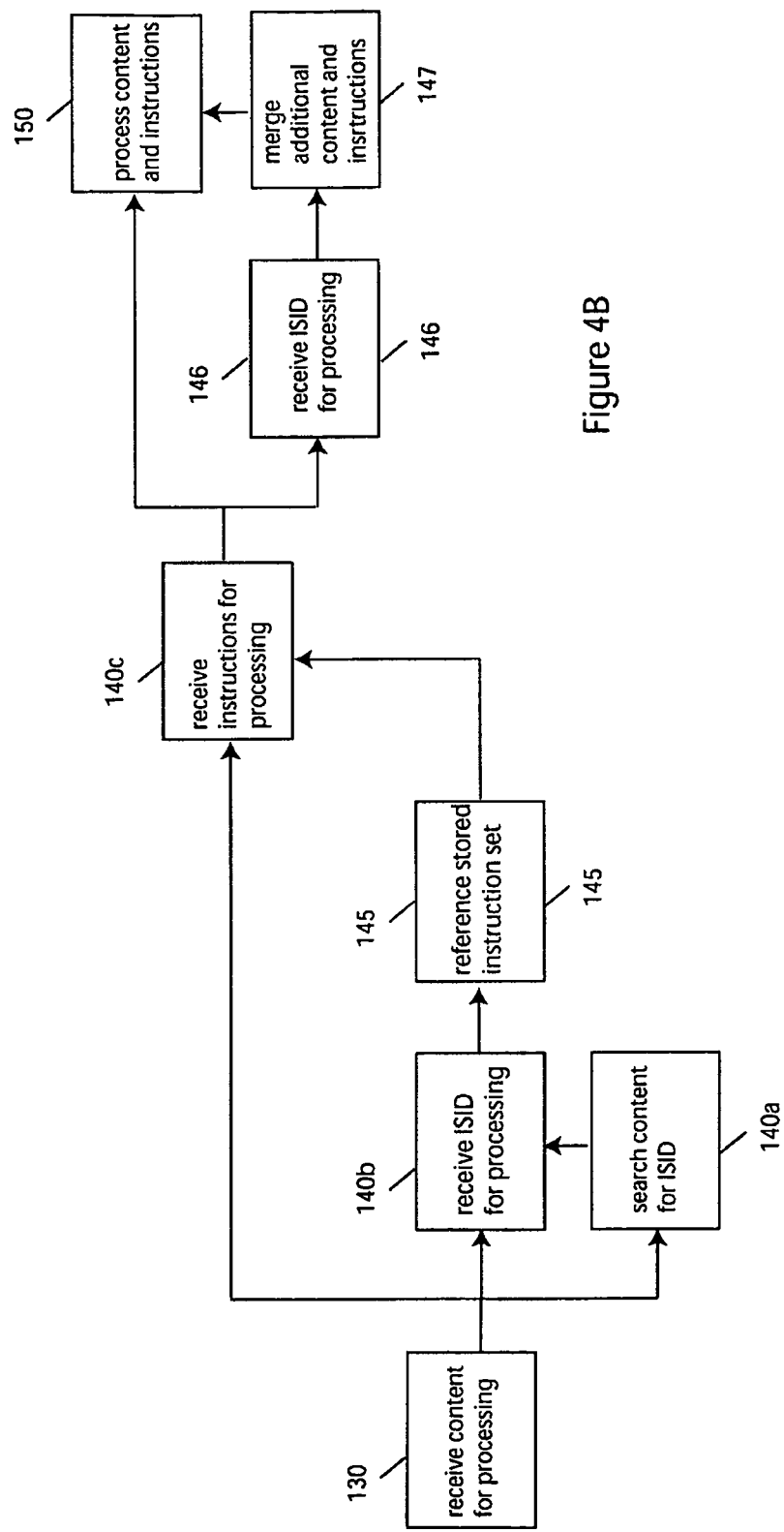

FIGS. 4A-4B depict operation of a content handling engine 11 according to one practice of the invention. The illustrated sequence of steps is just one of many with which the invention may be practiced. Thus, it may be practiced with a greater or lesser number of steps than those shown here, ordered as shown in the drawing or otherwise.

By way of overview, a content handling engine 11 executing in accord herewith distributes articles of content in accord with a workflow defined by a set of native instructions that are associated with codes embedded in the articles. Thus, for example, a code (e.g., "3434") embedded in a meta-data field of an Adobe PDF file may reference a set of native instructions specifying that PDF file should be delivered to a specified e-mail address in JPEG format and that a copy should be routed in text format to a specified document repository. By way of further example, when that code is embedded as spoken words in an audio file, the native instructions may specify that the audio file be converted to text (using voice-to-text conversion) before being sent to the specified e-mail address and/or repository.

Unlike document delivery systems currently available in the art, in which a cover sheet (or the like) bearing a routing code is removed from a document prior to its being routed to a recipient location, the content handling engine 11 of the illustrated system performs routing and other workflow processing on codes that are embedded in an article of content that form a portion of the content that is, itself, to be delivered to a recipient.

FIG. 4A depicts an initial, optional sequence of steps to create (or modify) and store an instruction set (e.g., in the illustrated database 43). This process is optional because a content handling request does not need to reference a stored instruction. Instead, for example, a new content handling request could itself supply the system 10 with all of the content and instructions necessary to perform the request, without any lookup or reference to a stored instruction set.

In step 100, a system administrator, user or other creates (or modifies) a native instruction set. In the illustrated embodiment, this is accomplished via interaction with message server 30, e.g., via a web client or administrative interface, executed directly on server 30 and/or via devices (e.g., desktop computers 20) coupled thereto, e.g., via an intranet 13, Internet, or otherwise.

Generally, native instruction sets define handling workflows for articles of digital content (e.g., PDF documents, movies, audio files, etc.,) or of content which can be converted to digital format (e.g., scannable paper, analog movies or audio recordings, X-rays, pictures. etc). More specifically, a native instruction set defines (i) delivery destinations (final or intermediate) for articles of content, (ii) format specification for articles of content, (iii) format conversions for articles of content (if necessary), and (iv) additional content to be included with delivery or other handling of articles of content.

Delivery destinations, in the illustrated embodiment, are typically entered interactively, although they can be imported programmatically and/or via batch jobs (e.g., executed on the content handling engine 11), including, for example, importing a list of actual or potential destinations from a Microsoft Outlook or other LDAP (lightweight directory access protocol) or mail server, a mail client, a SharePoint™ server, a contact manager, or otherwise. In preferred embodiments, an application for interactive definition of destinations provides a graphical user interface (GUI) that is modeled after and/or works in conjunction with a corporate mail client or server, such as Outlook®, though it may be modeled after and/or work in conjunction with other applications. Other interactive applications may use command line interfaces or otherwise.

By way of non-limiting example, delivery destinations may be defined via e-mail addresses, telefax numbers, printer addresses, local or network file system folders, content repository addresses, or other electronic content destinations. One or more destinations can be specified for each recipient, indicating preferred and/or required addresses for receipt of articles of content of specified types.

Formats via which articles of content are transmitted to those destinations (and any desirable or necessary conversions) may be defined as well, e.g., where this is not otherwise obvious from or necessitated by the destination address. By way of example, a destination can be specified as receiving (i) word processing documents or spreadsheets in PDF format by e-mail at a designated e-mail address, (ii) image documents (e.g., scans) by fax at a designated fax number, and (iii) audio files in MP4 format and movie files in MPEG format at a designated media data store. Message Server 30 may utilize composer module 40a to perform these and other conversions.

Additional digital content may also be included for delivery with an article of content. For example, an instruction set (or its associated native code) can specify that a particular file is to be sent with all articles of content that are the subject of a workflow. By way of further example, an instruction set can specify that all content bearing native code "3117" that is sent to destination "john@smith.com" always include a file "greeting.wav," along with an .avi file with a clip of the originating enterprise's latest advertising campaign.

In step 110, the content message server 30 stores native instructions sets for execution by the server 30 during content processing, as discussed further below. In the illustrated embodiment, the native instruction sets are stored in data store 43, although they may be stored otherwise (e.g., in a secondary data store, etc.).

In step 120, the message server 30 associates a native code with each native instruction set. In the illustrated embodiment, a native code is a unique identifier used to reference (e.g., execute) a particular native instruction set during handling of content by the message server 30. In one embodiment, native codes serve as primary keys for "looking-up" native instruction sets stored in a relational database. Although a native code is typically only a reference identifier (or database key) to a native instruction set, the native code may also be the instructions set itself. Such is the case, for example, where the native code is a two-dimensional (2D) bar code (or other coding) that directly embodies and/or encodes the instruction set.

Although FIG. 4A depicts a process for creating a new native instruction set, it will be appreciated that a similar process can be utilized for modifying a pre-existing instruction set. To that end, rather than a step of "creating new instruction set" as shown in FIG. 4A, the process of modifying an instruction set would provide for accessing a pre-existing instruction set (e.g., from database 43) and permitting the operator to make desired its to that set. The process of modifying an instruction set might also forgo step 120, utilizing, instead, the code associated with the pre-existing instruction set.

In the illustrated embodiment, articles of content are associated with instruction sets via native codes (or corresponding foreign codes)—which are embedded into the articles, e.g., via the message server 30, an end user and/or a foreign system. For example, a native code (or a foreign code that is associated with a native code) can be embedded into a metadata field of a PDF document by a foreign system user executing Adobe Acrobat. Similarly, a native or foreign code can be embedded into a PDF document via the Adobe Acrobat commenting tool. By way of further example, a native or foreign code can be embedded into a meta-data field of an .avi file with Quicktime Pro or other movie editor. Those skilled in the art will appreciate that these are but a few methods for embedding native or foreign codes in content and many other methods fall within the scope of the invention.

Although not necessary, the message server 30 may optionally output an embedable form of the native code. This may be, for example, a printout of a label bearing that code for affixation to documents that are to be processed according to the corresponding instruction set. By way of further example, this may be clip buffer text containing that code for pasting into the content of a digital data file (or an associated metadata field) that is also to be so processed. By way of still further example, it may be a still image of the text form of the code for insertion in a video file or the audio form of the code to be inserted into an audio file to be so processed. By way of still further example, the outputted embedable code may comprise the instruction set itself, e.g., encoded as a 2-D barcode that can be embedded on a document to be scanned or into a PDF document. See step 125. These steps 100-125 may be executed just once, but they may also be revisited, e.g., in connection with updating an instruction set.

FIG. 4B depicts the processing of a content handling request by the message server 30 into a complete content handling transaction in a system according to one practice of the invention. Generally, an element in a valid and complete content handling transaction is that it must have both (i) instructions that define delivery format(s) and destination(s), e.g., as described above, as well as (ii) content to deliver. In the illustrated embodiment, the specific incoming content handling request may supply all the content and all the instructions necessary. Thus, by way of non-limiting example, the content may be a Microsoft Word file submitted called DOCUMENT.DOC, and the instructions may specify that it should be e-mailed to user@company in PDF document format. In this case, there is no reference to a stored instruction set. See steps 130, 140c and 150, discussed further below.

The content and instructions, however, may be assembled differently to achieve the same end. It may occur, for example, that prior to submitting a content handling request to the system 10, the user previously created a stored instruction set (e.g., see steps illustrated in FIG. 4A) that defined that delivery should be to an e-mail to user@company.com and the content should be in PDF format. That stored instruction set would be able to be referenced by a unique identifier (e.g., an "instruction set identifier" or "ISID") for that instruction set. Thereafter, the content handling request could provide the content—DOCUMENT.DOC in our example—and a reference to the identifier of the stored instruction set and that these instructions should be used on the submitted content.

In fact all variations can exist where some or all of the content and/or instructions can be created and stored in a stored instruction set or supplied at the time of the content handling request. The stored instruction set is just a shorthand way of saving some of these elements so that they can be referenced and re-used as part of a content handling request.

A more detailed understanding of the foregoing process may be attained by reference to steps 130-150. As mentioned above, the illustrated sequence of steps is just one of many with which the invention may be practiced. Thus, it may be practiced with a greater or lesser number of steps than those shown here, ordered as shown in the drawing or otherwise.

In step 130, the message server 30 receives a content handling request. This may comprise one or more articles of content to be processed and/or instruction set identifiers (e.g., as where the instruction set, itself, specifies the articles to be processed). As discussed above, articles of content can be of any digital format, or they can be of any format which is convertible to a digital format. In the illustrated embodiment, the message server 30 receives the instruction set identifier and/or articles of content from illustrated client computers 20, e-mail server 15, content repositories 14a-14f, camera 25a, microphone 23a, etc., although such identifier and/or articles may be received from other sources, as well or in addition.

In step 140a, the message server 30 identifies a native code (or ISID) contained in a received article of content (or in an article of content specified by an instruction set identifier). In the illustrated embodiment, the message server 30 can identify such a code by a variety of means, including, by way of non-limiting example, bar code recognition, voice recognition, optical character recognition, and/or voice-to-text recognition, just to name a few. Typically, native codes are positioned at a predefined location within the content, although the message server 30 is capable of searching the entire article of content as necessary.

Once a native code has been identified, the message server 30 can reference and execute the instruction set associated with that code. See steps 145 and 150. In the illustrated embodiment, the message server 30 performs such referencing by either matching the native code to a pre-existing native instruction set (e.g., stored in data store 43), and modifying the instruction set as necessary, or creating a new instruction set.

Alternatively, the message server 30 identifies a foreign code in an article of content (or in an article specified by an instruction set identifier). In the illustrated embodiment, a foreign code can be one created by a foreign system that has meaning to the foreign system vis-a-vis routing or other handling. This can include, by way of non-limiting example, user-written notes (e.g., "to Bob"), bar codes, text strings, content type codes, audio signals or voice commands (e.g., "give to Radiology Department") that are or can be associated with native codes and/or instruction sets. Along similar lines, a hash or "fingerprint" of its content may be treated as a foreign code that maps to a native code.

As with native codes, the message server 30 can search an entire article of content for a foreign code, e.g., via bar code recognition, voice recognition, optical character recognition, and/or voice-to-text recognition, or otherwise. Once a foreign code has been identified, the message server 30 translates it into a native code and executes the native instruction set associated with that code (e.g., based on a prior association established by the user, the system administrator or otherwise). See steps 145 and 150. In the illustrated embodiment, the message server 30 performs such translation by either matching the foreign code to a pre-existing native instruction set (e.g., stored in data store 43), and modifying the instruction set as necessary, or creating a new instruction set.

In steps 140b and 140c, the message server 30 alternatively accepts a native or foreign code (step 140b) or native or foreign instruction set (step 140c) for execution on an article of content. By way of non-limiting example, a user may input the code or instruction set, via a GUI or otherwise, along with the article of content for processing. Upon accepting the code, the message server 30 executes the instruction set associated with that code on the article of content (see step 150).

In steps 146 and 147, an ISID is included in the content handling request, along with the submitted content (step 130) and instructions (step 140c), specifying additional content and/or instructions to be merged into the submitted content and instructions.

In step 150, as mentioned above, the message server 30 executes a native instruction set associated with a native code, e.g., specifying delivery destinations, format conversions, etc., on an article of content.

These steps 130-150 may be executed just once, but many articles of content will be repeatedly processed. See dashed line from step 150 to step 130. For example, the instruction set may be a workflow that calls for intermediate processing by a foreign system (e.g., execution by a user, or filling-in a form, or addition of new content, etc.—all as defined by or permitted by the workflow), after which the content is re-presented to this step for further processing.

More specifically, and, again by way of example, such intermediate processing by a foreign system may include embedding a printable bar code in an Adobe PDF document, which bar code is a native code. When the document is printed, the bar code is printed too. After the printed copy is "processed" by the foreign system (e.g., user signs, attaches documents, etc), the paper copy is rescanned (by user/foreign system) and re-presented to the native system (i.e., to the content handling engine) for processing in steps 130-150. This could mean printing for further signatures, storage, sending to another department by e-mail, etc.

Described above are methods and apparatus meeting the desired objectives. Those skilled in the art will appreciate that the embodiments herein are merely examples of the invention and that other embodiments incorporating changes therein fall within the scope of the invention, of which I claim:

The invention claimed is:

1. A method, comprising:
    receiving, by a processor of a computing device, an instruction set for a distribution, wherein the instruction set includes a content handling workflow comprising a plurality of steps for processing an article of content, wherein the plurality of steps specify (i) one or more destinations to route an article of content, (ii) one or more formats for the article of content, and (iii) an additional article of content to be included in the distribution with the article of content, wherein the addition article of content is separate and distinct from the article of content;
    storing, by the processor, in a data store, the instruction set;
    associating, by the processor, an embeddable code with the instruction set,
    receiving, by the processor, an article of content to be processed;
    identifying, by the processor, an embedded code on the article of content, wherein the embedded code is one or more bar codes, text strings, and/or image elements, wherein the content handling engine is configured to search a substantial portion of the article of content to identify the embedded code;
    associating, by the processor, the identified embedded code with the instruction set stored in the data store; and
    processing, by the processor, the article of content according to the instruction set associated with the embedded code;
    wherein processing the article of content includes (i) routing the article of content to a first destination in a first format and a second destination in a second format as specified by the instruction set, and (ii) routing a second article of content to the first and second destinations as specified by the instruction set.

2. The method of claim 1, wherein the data store comprises a plurality of instruction sets, each defining a content handling workflow.

3. The method of claim 2, wherein the embedded code is a unique identification of an instruction set.

4. The method of claim 3, wherein the embedded code is created and/or embedded in articles of content by a system external to the content handling system.

5. The method of claim 4, wherein the system external to the content handling engine includes any of an e-mail system, an enterprise content management system or other system from which articles of content processed by the content handling engine are obtained.

6. The method of claim 4, wherein the system external to the content handling engine includes a combination of automated, semi-automated or manual elements from which articles of content processed by the content handling engine are obtained.

7. The method of claim 4, wherein the embedded code is translated into a unique instruction set identification with which it is associated.

8. The method of claim 2, wherein the digital data store is distributed.

9. The method of claim 5 wherein the embedded code is not contained at a predefined position in the article of content.

10. The method of claim 9, the embedded code is identified by at least one of bar code recognition, voice recognition, optical character recognition and voice-to-text conversion.

11. The method of claim 9, wherein the embedded code is identified from a characteristic of the article itself, the manner in which it is encoded and/or stored, and/or the substance of the content.

12. The method of claim 6, the embedded code is identified by transforming at least a portion of the article of content from a first format to a second format and extracting the embedded code therefrom.

13. The method of claim 10, wherein the embedded code is identified by at least one of (i) optical character recognition and (ii) voice-to-text conversion.

14. The method of claim 13, wherein the embedded code is identified by at least searching a portion of the article of content transformed from the first format to a second format.

15. The method of claim 7, wherein the embedded code is identified by any of bar code recognition, voice recognition, optical character recognition and voice-to-text conversion.

16. A content handling system, comprising:
    a content handling engine comprising a processor, wherein the content handling engine is configured to receive an instruction set for a distribution, wherein the instruction set includes a content handling workflow comprising a plurality of steps for processing an article of content, wherein the plurality of steps specify (i) one or more destinations to route the article of content, (ii) one or more formats for the article of content, and (iii) an additional article of content to be included in the distribution with the article of content, wherein the addition article of content is separate and distinct from the article of content; and
    a digital data store in communication with the content handling engine, wherein the digital data store stores instruction sets received by the content handling engine, wherein the content handling engine is further configured to:
        receive, by the processor, a content handling request comprising an article of content to be processed, identify, by the processor, an embedded code on the article of content, wherein the embedded code is one or more bar codes, text strings, and/or image elements, wherein the content handling engine is configured to search a substantial portion of the article of content to identify the embedded code;

associate, by the processor, the identified embedded code with a corresponding instruction set stored in the digital data store; and process, by the processor, the article of content according to an instruction set associated with the embedded code, wherein processing the article of content includes (i) routing the article of content to a first destination in a first format and a second destination in a second format as specified by the instruction set, and (ii) routing a second article of content to the first and second destinations as specified by the instruction set.

17. The content handling system of claim 16, wherein the article of content comprises any of digitally encoded information and/or information otherwise convertible to digital format.

18. The content handling system of claim 17, wherein the digitally encoded information includes any of one or more of text, image, audio, video, data, and PACS data.

19. The content handling system of claim 18, wherein the information otherwise convertible to digital format includes any of printed matter, images, film, and audio recordings.

20. The content handling system of claim 17, wherein the instruction set specifies a conversion to be executed on said articles of content, wherein the conversions comprises a member selected from the group consisting of optical character recognition, voice-to-text, image resolution upgrading, and image resolution downgrading.

21. The content handling system of claim 18, wherein the one or more destinations include any of e-mail addresses, local or network file system folders, and on-line data stores.

22. The content handling system of claim 19, wherein the one or more formats include any of text, image, audio, video, data, and PACS data formats.

23. The content handling system of claim 20, wherein the additional content includes any of textual, image, audio, video, data, and PACS data content.

24. The content handling system of claim 21, wherein the content handling engine discerns the embedded code from a characteristic of the article itself, the manner in which it is encoded and/or stored, and/or the substance of the content.

25. The content handling system of claim 22, further comprising an agent that generates a request to the content handling engine to execute any of default and/or explicit instruction sets on an identified article of content.

26. The content handling system of claim 25, wherein the agent identifies said article of content by searching systems external to the content handling engine for articles containing any of embedded codes and/or instruction sets.

* * * * *